United States Patent [19]

Hitch

[11] Patent Number: 4,598,692
[45] Date of Patent: Jul. 8, 1986

[54] UNIVERSAL GAS BURNER AND DUAL ADJUSTABLE FLEXIBLE VENTURI TUBE ARRANGEMENT FOR GAS BARBEQUE GRILLS

[75] Inventor: Robert J. Hitch, Columbus, Ga.

[73] Assignee: W. C. Bradley Company, Columbus, Ga.

[21] Appl. No.: 672,470

[22] Filed: Nov. 19, 1984

[51] Int. Cl.⁴ .............................................. F24C 3/04
[52] U.S. Cl. .................................. 126/41 R; 138/121; 285/302; 285/903
[58] Field of Search ............... 126/41 R; 285/DIG. 4, 285/302; 138/121

[56] References Cited

U.S. PATENT DOCUMENTS

| | | | |
|---|---|---|---|
| 4,081,190 | 3/1978 | Itzler | 138/121 |
| 4,373,505 | 2/1983 | Koziol | 126/41 R |
| 4,478,205 | 10/1984 | Koziol | 126/41 R |
| 4,488,534 | 12/1984 | Koziol | 126/41 R |

FOREIGN PATENT DOCUMENTS 2524492 12/1976 Fed. Rep. of Germany .... 126/39 R

Primary Examiner—Carroll B. Dority, Jr.
Attorney, Agent, or Firm—Newton, Hopkins & Ormsby

[57] ABSTRACT

A burner element for gas fired barbecue grills of varying designs and styles is rendered universal in its applicability to such grills by the provision therein of gas/air inlet openings in varied arrangements to enable connection of the burner element to flexible length adjustable venturi tubes in different modes of use, such as in a bent extended mode or a straight foreshortened mode. Inactive gas/air inlet openings of the burner element are covered during non-use. A burner system is provided which is compatible with grills having either post mounted or panel mounted burner controls.

10 Claims, 8 Drawing Figures

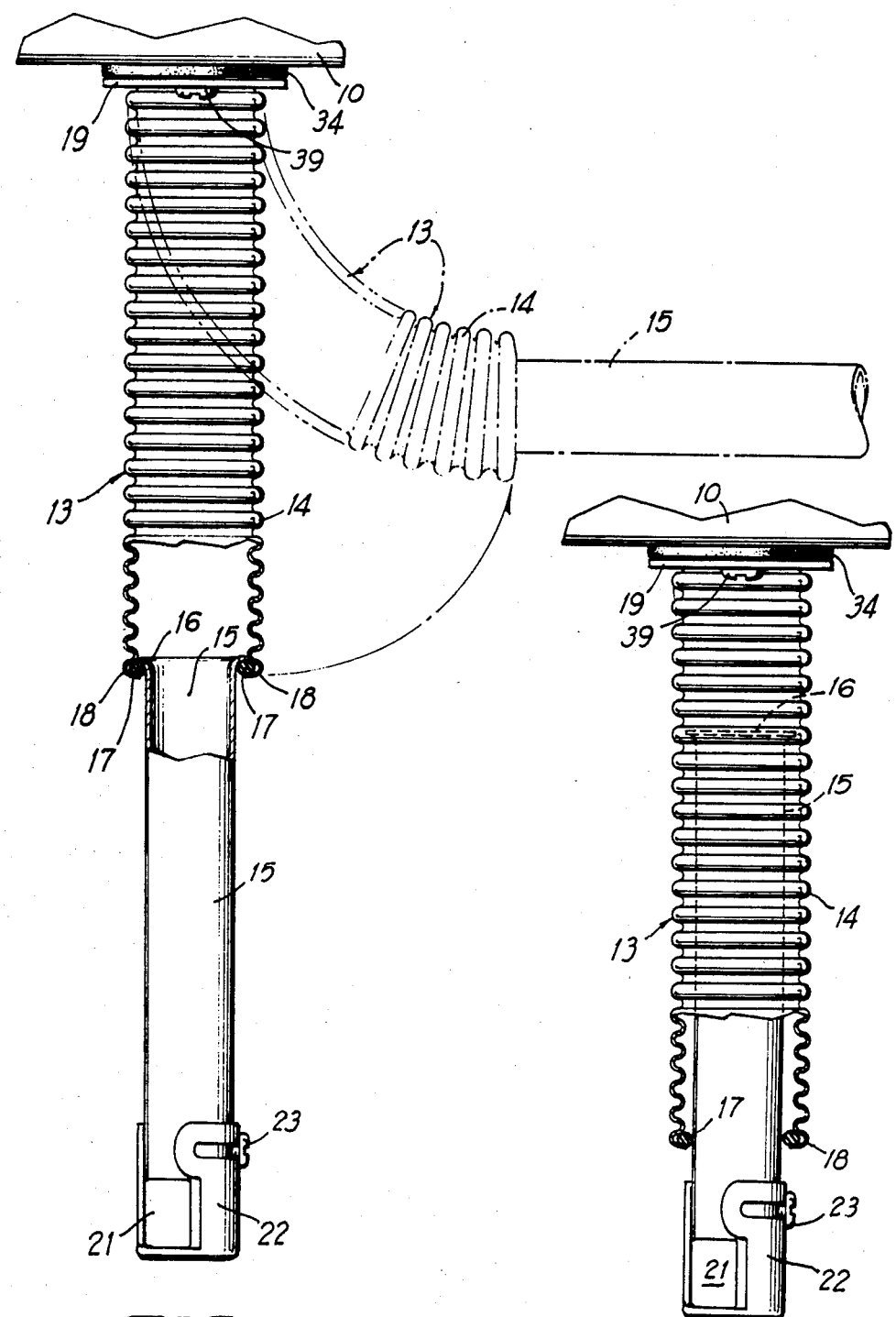

UNIVERSAL GAS BURNER AND DUAL ADJUSTABLE FLEXIBLE VENTURI TUBE ARRANGEMENT FOR GAS BARBEQUE GRILLS

BACKGROUND OF THE INVENTION

Single and plural gas and air feeding venturi tubes for burner elements of gas fired barbecue grills are known in the prior art. A problem sometimes arises, however, in adapting more or less standard burner elements and their feeder tubes to grills which are varied in their designs and styles, such as those which have post mounted gas controls and those which have panel mounted controls. Accordingly, the principal objective of this invention is to provide a gas burner arrangement which is universally applicable to the largest possible range of gas fired barbecue grills, whose design characteristics vary, and not limited in use to a single grill style or design.

In accordance with the essence of the present invention, an essentially standard type of burner element employed with flexible length adjustable venturi tubes is provided with varying configurations or arrangements of gas/air inlet openings, whereby gas and air feeder venturi tubes can be operatively connected to the burner element at different locations thereon to facilitate arranging the feeder venturi tubes in different use modes dictated by the design construction or style of a particular gas fired grill. Idle inlet openings of the burner element are conveniently covered and sealed during periods of non-use. The gas/air feeder venturi tubes employed with the universal burner element are both flexible and longitudinally extensible and retractable to further enhance the universality of the burner system with respect to grills having differing design characteristics.

A further and more specific object of the invention is to provide a universal gas burner arrangement for barbecue grills characterized by simplicity and economy of construction, convenience of use and reliability of operation in connection with varying grill styles.

A further object of the invention is to provide a flexible and adjustable feeder venturi tube for universal burner element having an improved and simplified air inlet arrangement.

Other features and advantages of the invention will become apparent to those skilled in the art during the course of the following description.

BRIEF DESCRIPTION OF THE DRAWINGS

FIG. 3 is an enlarged side elevation, partly in cross section, showing a gas/air feeder venturi tube assembly constructed in accordance with one embodiment of the invention.

FIG. 4 is a similar view showing the venturi tube assembly in a retracted state to facilitate usage with gas burner controls on certain styles of grills.

DETAILED DESCRIPTION

Figure 1:
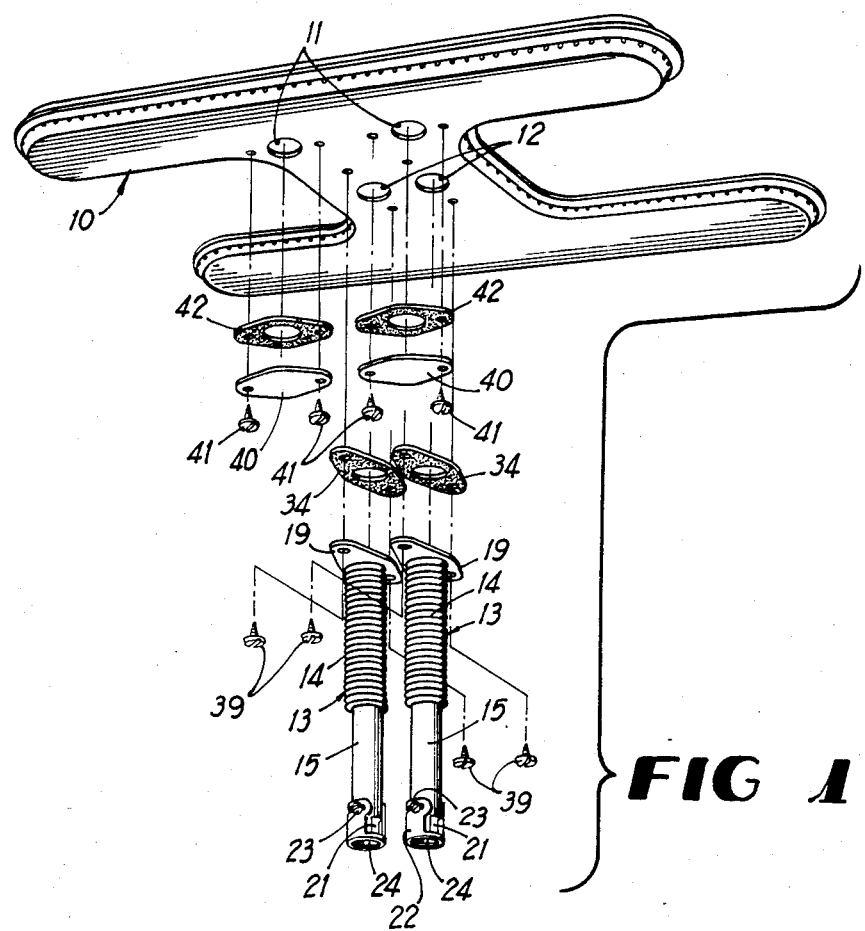
FIG. 1 is an exploded perspective view of a universal gas burner arrangement for gas fired barbecue grills according to the present invention.

Referring to the drawings in detail wherein like numerals designate like parts, a universal gas burner arrangement for gas fired barbecue grills of various styles and designs is shown in the drawings.

More particularly, a generally conventional gas burner element 10 is provided in its bottom wall with a varied arrangement of gas/air inlet openings, such as the separated sets of inlet openings 11 and 12. The set of openings 12, namely a pair of openings in the illustrated embodiment, is located centrally on the burner element 10, while the set 11 is located off-center and near one side portion of the burner element. The openings of the sets or pairs 11 and 12 may also have different spacings, as illustrated. In each set 11 and 12, at least one inlet opening is placed on each side of an internal partition, not shown, which divides the burner element 10 into two sections, according to conventional practice. It should be recognized that the number of sets of inlet openings in the burner element may vary in the invention as may the number of inlet openings within each set, so as to render the burner system universal to the greatest possible extent in its relationship to various designs and styles of gas fired grills.

Figure 2:
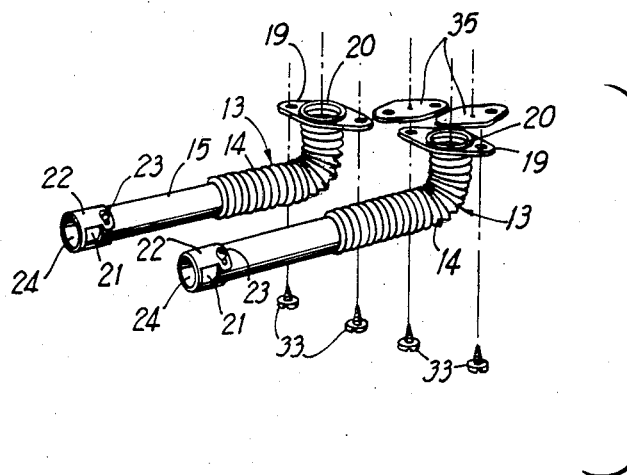
FIG. 2 is a similar view of gas/air feeder venturi tubes according to the invention in a flexed and extended use mode.
Figure 5:
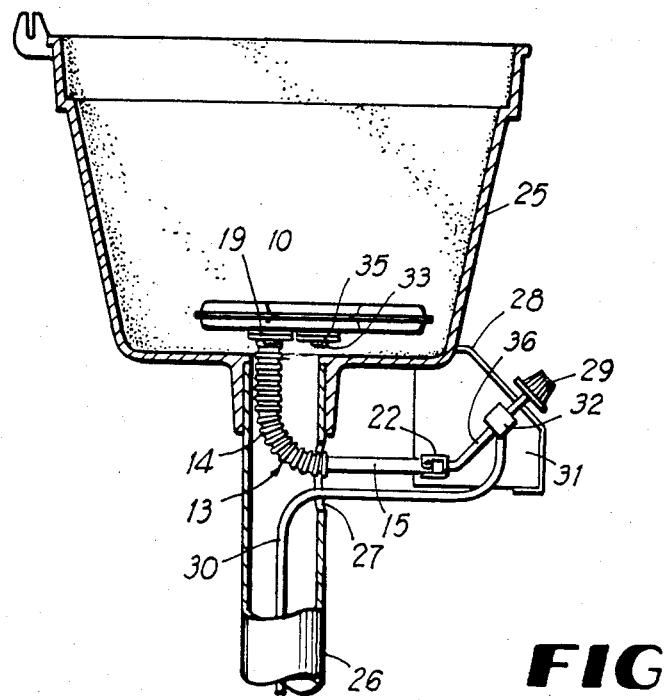
FIG. 5 is a side elevation, partly in cross section, showing a burner system according to the invention being used on a grill having panel mounted burner controls.
Figure 6:
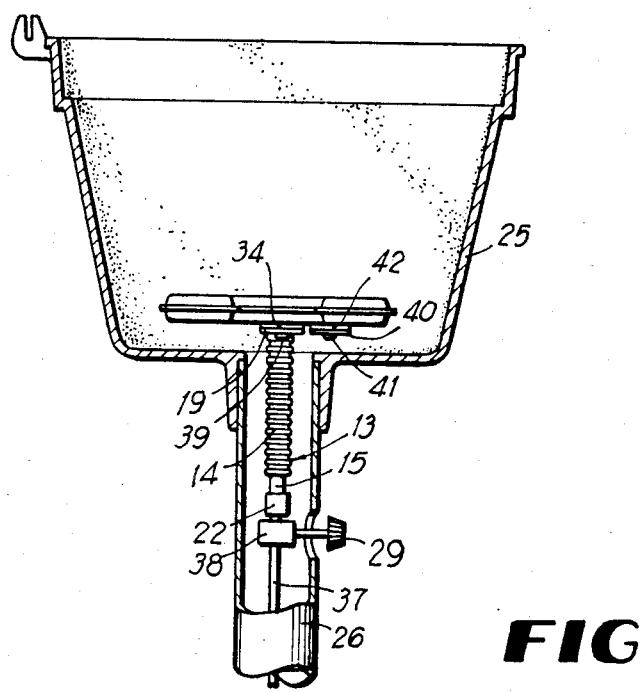
FIG. 6 is a similar view of the invention in use on a grill having post mounted burner controls.

The burner element 10 possessing the diverse sets of inlet openings 11 and 12 is utilized with gas/air feeder venturi tube assemblies 13. As will be further described, the tube assemblies 13 can operate in a flexible configuration as shown in FIGS. 2 and 5 or in a straight mode as shown in FIGS. 1 and 6. This diversity of use is what enables the invention to satisfy the needs of different makes and styles of commercial gas fired grills on a much more universal basis than known prior art burner arrangements.

In accordance with a first embodiment, FIGS. 3 and 4, each gas/air feeder venturi tube assembly 13 comprises a length 14 of flexible gas conduit of a known type, telescopically adjustably receiving therein a straight rigid venturi tube section 15 of cylindrical form having a top annular flange 16 of slightly smaller diameter than the bore of the flexible conduit 14. Optionally, a ring seal 17 can be captively held in one corrugation 18 of the flexible conduit 14, preferably although not necessarily the endmost corrugation. The ring seal 17 sealingly engages the periphery of the straight rigid venturi tube section 15 in all adjusted positions of the latter relative to the flexible conduit 14. As illustrated in FIGS. 3 and 4, the tube section 15 is extensible and retractable to any necessary degree to enable hooking up the tube assembly 13 with the gas controls of diverse types of grills, for example, the grills shown in FIGS. 5 and 6.

One end of the flexible conduit 14 is received in an opening of a rigid mounting flange or plate 19, connected to the flexible conduit by crimping, as indicated by the numeral 20 in FIG. 2.

The far end of each venturi tube section 15 in the embodiment shown in FIGS. 3 and 4 has a side air inlet opening 21 regulated by a circumferentially adjustable gate 22 having a locking screw 23. Gas enters each tube assembly 13 through the bore 24 of the venturi tube section 15.

When a grill having the configuration shown in FIG. 5 is involved, the tube assemblies 13 are employed with the universal burner element 10 in a bent or flexed mode, as shown. The grill in FIG. 5 includes a base 25 carried by a tubular vertical post 26 having a side opening 27 and a front inclined panel 28 adjacent to which a gas flame adjustment knob 29 is installed.

Gas is delivered upwardly through a tube 30 within the post 26, this tube extending outwardly through the opening 27 and into a chamber 31 beneath the panel 28, where the tube is connected to a gas regulator valve 32 controlled by the knob 29.

The tube mounting flanges 19 are secured by screws 33, FIG. 2, to the bottom wall of burner element 10 so that the bores of flexible conduits 14 are in registration with the openings 11. Gaskets are placed between the flanges 19 and the burner bottom wall to prevent leakage. The burner inlet openings 12 are idle at this time, and are closed by cover plates 35, FIG. 2, secured by screws, with gaskets placed between the cover plates 35 and the bottom wall of burner element 10.

With reference to FIG. 5, the flexed conduits 14 extend downwardly into post 26 and the rigid venturi tube sections 15 assume substantially horizontal positions and extend outwardly from the post 26 for connection in the chamber 31 with a gas delivery tube 36 extending rearwardly from the gas valve 32. The tubes 36 and 15 are coupled in a conventional manner. The ready extendability and retractability of the tube section 15 relative to the flexible conduit 14 facilitates making the burner installation on the style of barbecue grill shown in FIG. 5 as well as on other types of grills having panel mounted burner controls.

When the universal burner system according to the invention is used with a grill of the type shown in FIG. 6 having post mounted burner controls, the tube assemblies 13 are employed in a straight mode. The grill shown in FIG. 6 has its base 25 supported by the post 26, as previously described, but the gas flame regulator knob 29 is located at one side of the post 26 instead of being adjacent to a panel. Gas is delivered upwardly through a vertical tube 37 in the post 26 to a gas valve 38, also within the post, controlled by the knob 29. The valve 38 is conventionally coupled with the straight venturi tube section 15 of each tube assembly 13. Again, the length adjustability of the assembly 13 or assemblies greatly facilitates the installation of the burner system on a grill of the type shown in FIG. 6 or any similar grill type. As shown in FIG. 6, the venturi tube sections 15 are substantially fully retracted into the flexible conduit 14.

In this mode of use, the tube assembly flanges 19 are secured by screws 39, FIG. 1, to the bottom wall of burner element 10, with the bores of flexible conduits 14 in registration with the inlet openings 12. Gaskets 34 are placed between the flanges 19 and the bottom wall of the burner element. The idle inlet openings 11 are now covered by plates 40 secured to the burner element bottom wall by screws 41, with gaskets 42 placed between the plates 40 and burner element.

Figure 7:
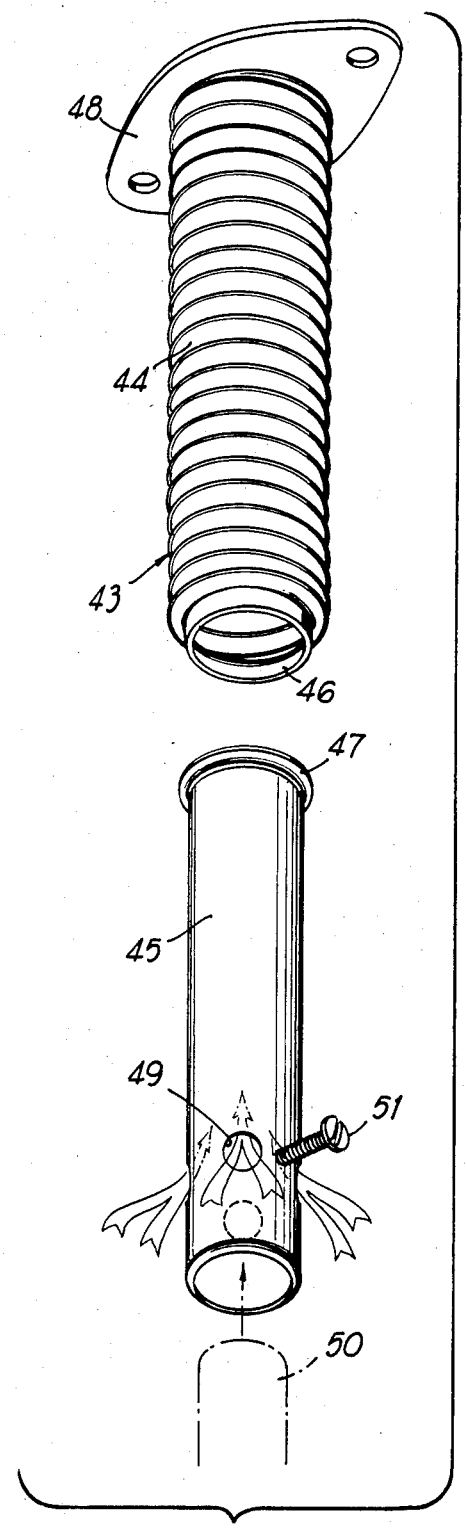
FIG. 7 is an exploded perspective view of a feeder venturi tube assembly according to a second embodiment of the invention.
Figure 8:
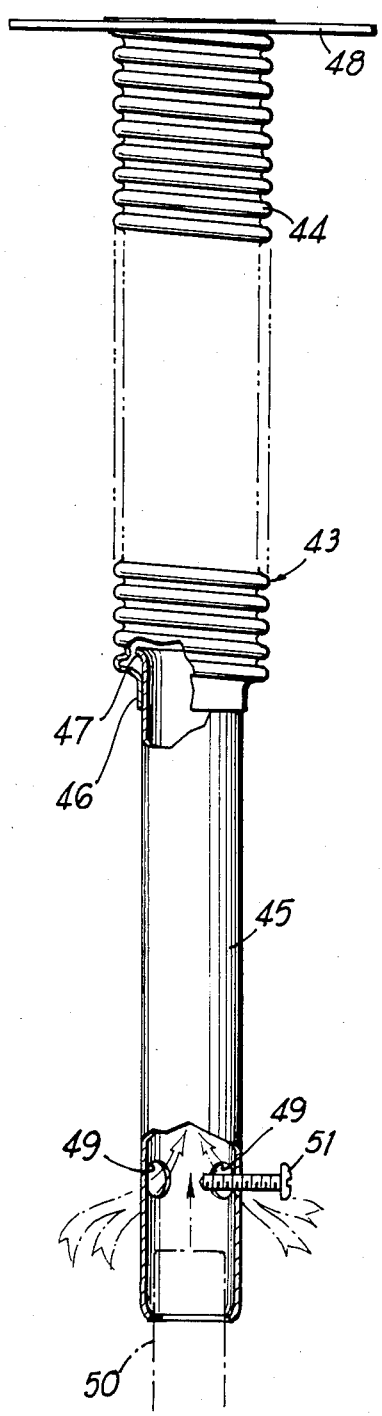
FIG. 8 is an assembled side elevation, partly in section, of the feeder venturi tube assembly according to the second embodiment.

A second embodiment of the gas/air feeder tube assembly according to the invention is indicated by the numeral 43 in FIGS. 7 and 8. This second embodiment is somewhat simpler and more economical than the tube assembly 13 and is equally applicable to the universal burner element 10, in lieu of the assembly 13. The tube assembly 43 includes a corrugated flexible conduit section 44 of the required length and a coacting straight rigid venturi tube section 45 having length adjustable telescoping engagement within the flexible conduit 44. The conduit 44 has an end reduced diameter cylindrical sleeve extension 46 which slidably receives the cylindrical tube section 45, the latter having an end flange 47 which limits the outward extension of the venturi tube section 45 from the flexible conduit section 44.

The other end of conduit section 44 has a mounting flange or plate 48 connected therewith by crimping as previously described in connection with the tube assembly 13.

In lieu of the rotary gate or shutter 22 and variable air inlet opening 21, FIGS. 3 and 4, the venturi tube section 45 has fixed circumferentially spaced air inlet openings 49 near its end which is connected to the gas delivery tube 50. A spoiler screw or screws 51 is provided on the tube section 45 at the location of the openings 49 to act on the air streams entering the tube assembly through the openings 49.

The tube assembly 43 depicted in FIGS. 7 and 8 is employed with the universal burner element 10 according to the invention in the identical manner previously described in connection with the tube assembly 13.

It may now be seen that the invention fully accomplishes the objective of providing a substantially universal burner system for gas fired grills of various makes and styles, so that the necessity for custom designing of a burner system for each and every grill style and configuration is eliminated to the greatest possible extent.

It is to be understood that the form of the invention herewith shown and described is to be taken as a preferred example of the same, and that various changes in the shape, size and arrangement of parts may be resorted to, without departing from the spirit of the invention or scope of the subjoined claims.

1. A universal burner system for diverse forms of gas fired barbecue grills comprising a universal burner element having a diverse arrangement of gas/air inlet openings in its bottom wall, at lease one longitudinally extensible and retractable and flexible gas/air feeder venturi tube assembly, said tube assembly including a flexible conduit section and a substantially straight and rigid venturi tube section having air inlet means telescopically engaged adjustably within the flexible conduit section for changing the effective length and curvature of said tube assembly, said flexible conduit section having a reduced diameter cylindrical sleeve extension on one end thereof telescopically and slidably receiving said venturi tube section therein, and a flange on one end of the venturi tube section of somewhat larger diameter than the diameter of said sleeve extension but smaller than the internal diameter of said flexible conduit section, means to couple one end of said tube assembly in communication with one of said gas/air inlet openings, means to cover the other gas/air inlet openings in said bottom wall, and means to couple the other end of said tube assembly in communication with a gas supply and gas flow control means of a gas fired barbecue grill on which the universal burner system is installed.

2. A universal burner system for diverse forms of gas fired barbecue grills as defined in claim 1, and the air inlet means of said venturi tube section being adjustable.

3. A universal burner system for diverse forms of gas fired barbecue grills as defined in claim 1, and the air inlet means of said venturi tube section including fixed air inlet openings in the venturi tube section, and an adjustable air stream spoiler means on the venturi tube section.

4. A universal burner system for diverse forms of gas fired barbecue grills as defined in claim 1, including an attachment plate secured to one end of said tube assembly and being adapted for fixed attachment to the burner element bottom wall.

5. A universal burner system for diverse forms of gas fired barbecue grills as defined in claim 4, including cover plate means for said other opening or openings in said bottom wall of said burner element.

6. A universal burner system for diverse forms of gas fired barbecue grills as defined in claim 1, and some of said gas/air inlet openings being arranged centrally on said bottom wall and the other openings being arranged off-center on the bottom wall.

7. A universal burner system for diverse forms of gas fired barbecue grills as defined in claim 6, and the multiple gas/air inlet openings being arranged in spaced groups and the spacing of openings in the groups being varied.

8. A universal burner system for diverse forms of gas fired barbecue grills as defined in claim 1, said burner element having an essentially flat bottom wall and said bottom wall having pairs of screw-threaded openings on opposite sides of the gas/air inlet openings whereby apertured attachment flanges of feeder venturi tube assemblies can be readily secured to said bottom wall.

9. A flexible and length adjustable gas/air feeder venturi tube assembly for connecting a universal gas burner element with gas controls on diverse types of gas fired barbecue grills, said assembly comprising a flexible conduit section having a substantially flat mounting flange secured to one end thereof, a straight cylindrical substantially rigid venturi tube section telescopically and slidably engaged with the flexible conduit section, said flexible conduit section having a reduced diameter cylindrical sleeve extension on one end thereof telescopically and slidably receiving said venturi tube section therein, and a flange on one end of the venturi tube section of somewhat larger diameter than the diameter of said sleeve extension but smaller than the internal diameter of said flexible conduit section, and air inlet means on said venturi tube section near the end thereof away from said flexible conduit section.

10. A universal burner system for diverse forms of gas fired barbecue grills as defined in claim 9, and the air inlet means of said venturi tube section including fixed air inlet openings in the venturi tube section, and an adjustable air stream spoiler means on the venturi tube section.

* * * * *